US011899696B2

(12) United States Patent
Hoffman et al.

(10) Patent No.: US 11,899,696 B2
(45) Date of Patent: Feb. 13, 2024

(54) SYSTEMS AND METHODS FOR GENERATING MULTI-PART PLACE IDENTIFIERS

(71) Applicant: SafeGraph, Inc., San Francisco, CA (US)

(72) Inventors: Auren Hoffman, San Francisco, CA (US); Felix Cheung, San Francisco, CA (US); Lauren Spiegel, San Francisco, CA (US); Piotr W. Kozikowski Kruczkowska, San Francisco, CA (US); Russ Thompson, San Francisco, CA (US); Christopher Jones, San Francisco, CA (US); Ross Epstein, San Francisco, CA (US); Roshan George, San Francisco, CA (US)

(73) Assignee: SafeGraph, Inc., San Francisco, CA (US)

( * ) Notice: Subject to any disclaimer, the term of this patent is extended or adjusted under 35 U.S.C. 154(b) by 75 days.

(21) Appl. No.: 17/064,421

(22) Filed: Oct. 6, 2020

(65) Prior Publication Data
US 2022/0107967 A1    Apr. 7, 2022

(51) Int. Cl.
*G06F 16/29*  (2019.01)
*H04W 4/02*   (2018.01)
(Continued)

(52) U.S. Cl.
CPC .......... *G06F 16/29* (2019.01); *G01C 21/005* (2013.01); *G01C 21/30* (2013.01);
(Continued)

(58) Field of Classification Search
CPC ...... G06T 17/05; G06F 16/29; G01C 21/3673
(Continued)

(56) References Cited

U.S. PATENT DOCUMENTS 5,175,774 A * 12/1992 Truax ................. B44B 7/00
                                              257/E23.179
8,085,924 B2 * 12/2011 Shaffer ............... H04Q 3/0029
                                              379/221.14
(Continued)

FOREIGN PATENT DOCUMENTS

KR    10-2013-0082582 A    7/2013
KR    10-2015-0112138 A    10/2015
(Continued)

OTHER PUBLICATIONS

Issac Brodsky et al., H3: Uber's Hexagonal Hierarchical Spatial Index, Jun. 27, 2018, Uber Blog, pp. 1-16 (Year: 2018).*
(Continued)

*Primary Examiner* — Alex Gofman
*Assistant Examiner* — Linh Black
(74) *Attorney, Agent, or Firm* — Flagship Patents; Sikander M. Khan; Shiv S. Naimpally

(57) ABSTRACT

The technology disclosed relates to systems and methods for generating a multi-part place identifier with at least one part. The system includes logic to receive a location address and a place name wherein the location address is a validated address. The system includes logic to calculate a geocode for the location address and use the geocode to identify a geometrical boundary encompassing the location address. The system includes logic to convert the identified geometrical boundary to an alpha-numeric identifier forming a Where part of the multi-part place identifier. The system can use an input location address or a place name to match a previously generated and stored multi-part place identifier. The system can provide the generated or matched multi-part place identifier to a user for use in further analysis.

25 Claims, 12 Drawing Sheets

(51) Int. Cl.
  *G01C 21/36* (2006.01)
  *G01C 21/30* (2006.01)
  *G01C 21/00* (2006.01)
  *H04L 67/52* (2022.01)
(52) U.S. Cl.
  CPC .......... *G01C 21/3679* (2013.01); *H04L 67/52* (2022.05); *H04W 4/02* (2013.01)
(58) Field of Classification Search
  USPC .......... 707/705, E17.018, E17.038, E17.039, 707/724, 729
  See application file for complete search history.

(56) References Cited

U.S. PATENT DOCUMENTS

| | | | |
|---|---|---|---|
| 9,602,674 B1 | 3/2017 | Polega et al. | |
| 9,690,807 B2* | 6/2017 | Rollins | G06F 16/5846 |
| 10,395,231 B2* | 8/2019 | Fitzsimmons | H04L 65/762 |
| 10,475,054 B1* | 11/2019 | Riazzi | G06Q 30/0201 |
| 10,489,387 B1 | 11/2019 | Rogynskyy et al. | |
| 10,534,784 B2* | 1/2020 | Cousins | G06F 17/18 |
| 10,916,127 B2* | 2/2021 | Lewis | G07C 5/085 |
| 2002/0002590 A1* | 1/2002 | King | G06Q 10/107 |
| | | | 709/206 |
| 2002/0054082 A1* | 5/2002 | Karpf | G06F 3/0481 |
| | | | 715/738 |
| 2002/0126695 A1* | 9/2002 | Yoshida | H04J 3/1611 |
| | | | 370/465 |
| 2002/0188581 A1 | 12/2002 | Fortin et al. | |
| 2003/0097654 A1* | 5/2003 | Franken | H04B 7/18547 |
| | | | 348/E7.06 |
| 2003/0140061 A1 | 7/2003 | Singer | |
| 2004/0008225 A1 | 1/2004 | Campbell | |
| 2004/0190497 A1* | 9/2004 | Knox | H04M 7/1285 |
| | | | 370/352 |
| 2006/0041573 A1* | 2/2006 | Miller | G06F 16/29 |
| 2007/0265781 A1 | 11/2007 | Nemethy et al. | |
| 2008/0091460 A1* | 4/2008 | Paul | G06Q 30/0283 |
| | | | 705/400 |
| 2008/0301092 A1* | 12/2008 | Jayanti | G06F 16/334 |
| 2009/0259575 A1* | 10/2009 | Zivic | G06Q 10/08 |
| | | | 709/204 |
| 2009/0327314 A1 | 12/2009 | Kim et al. | |
| 2010/0121710 A1* | 5/2010 | Chipman | G06Q 30/0261 |
| | | | 705/14.51 |
| 2011/0066281 A1* | 3/2011 | Ksiazek | B07C 3/12 |
| | | | 700/227 |
| 2011/0161334 A1* | 6/2011 | Sivakkolundhu | G06F 16/29 |
| | | | 707/E17.014 |
| 2012/0001915 A1 | 1/2012 | Peterson | |
| 2012/0047288 A1* | 2/2012 | Kretschmann | H05K 7/1468 |
| | | | 710/8 |
| 2012/0059853 A1* | 3/2012 | Jagota | G06F 16/29 |
| | | | 707/E17.014 |
| 2012/0095882 A1* | 4/2012 | Wolff | G06Q 30/0643 |
| | | | 705/27.2 |
| 2012/0162225 A1 | 6/2012 | Yang et al. | |
| 2012/0166403 A1 | 6/2012 | Kim et al. | |
| 2012/0166611 A1 | 6/2012 | Kim et al. | |
| 2012/0316963 A1 | 12/2012 | Moshfeghi | |
| 2013/0073423 A1* | 3/2013 | Allen | G06Q 30/02 |
| | | | 705/26.8 |
| 2013/0086072 A1* | 4/2013 | Peng | G06F 16/9537 |
| | | | 707/754 |
| 2013/0226929 A1* | 8/2013 | Yeerelly | G06Q 10/107 |
| | | | 707/741 |
| 2013/0342565 A1 | 12/2013 | Sridhara et al. | |
| 2014/0280180 A1 | 9/2014 | Edecker et al. | |
| 2014/0304262 A1 | 10/2014 | Makki et al. | |
| 2014/0324844 A1 | 10/2014 | Hancock et al. | |
| 2015/0007080 A1* | 1/2015 | Nama | G01C 23/00 |
| | | | 715/771 |
| 2015/0012214 A1* | 1/2015 | Geelen | C09B 29/106 |
| | | | 701/532 |
| 2015/0149659 A1 | 5/2015 | Emadzadeh et al. | |
| 2015/0193447 A1* | 7/2015 | Voinea | G06F 16/9535 |
| | | | 707/767 |
| 2015/0227632 A1* | 8/2015 | Lunardi | G06F 16/337 |
| | | | 707/722 |
| 2016/0323241 A1* | 11/2016 | Jones | G06Q 10/063 |
| 2017/0017921 A1* | 1/2017 | Reeder | G06Q 10/0838 |
| 2017/0031920 A1 | 2/2017 | Manning et al. | |
| 2017/0052958 A1* | 2/2017 | Manning | G06F 16/35 |
| 2017/0351717 A1 | 12/2017 | Kabra et al. | |
| 2018/0095977 A1 | 4/2018 | Reddy et al. | |
| 2018/0129938 A1 | 5/2018 | Xiong et al. | |
| 2018/0182381 A1 | 6/2018 | Singh et al. | |
| 2018/0268253 A1 | 9/2018 | Hoffman et al. | |
| 2019/0073807 A1 | 3/2019 | Bliss et al. | |
| 2019/0155847 A1 | 5/2019 | Borkum et al. | |
| 2019/0286793 A1* | 9/2019 | Patton | H04L 51/52 |
| 2020/0034344 A1 | 1/2020 | Borkum | |
| 2020/0175767 A1* | 6/2020 | Stivi | G08B 25/10 |
| 2020/0311838 A1 | 10/2020 | Kurtt | |
| 2020/0364248 A1* | 11/2020 | Hancock | H04L 63/10 |
| 2020/0403965 A1* | 12/2020 | Jones | G06F 16/22 |
| 2021/0142527 A1* | 5/2021 | Gyurdiev | G01C 21/3673 |

FOREIGN PATENT DOCUMENTS

| | | |
|---|---|---|
| WO | 2007027608 A2 | 3/2007 |
| WO | 2020040799 A1 | 2/2020 |

OTHER PUBLICATIONS

PCT/US2021/045617—International Search Report and Written Opinion dated Nov. 28, 2021.
U.S. Appl. No. 17/064,436—Office Action dated Feb. 2, 2022, 18 pages.
H3, version 3.x, H3geo.org, 1 page (downloaded from https://h3geo.org/docs).
Google Open Location Code, Release 5, Jul. 2019, 3 pages, (downloaded from https://github.com/google/open-location-code).
Geohash, Wikipedia.com, last update Dec. 2021, 11 pages.
S2-geometry-library, Google Code Archive, 2016, 1 page.
Brodsky, H3: Ubers Hexagonal Hierarchical Spatial Index, Uber Engineering, Uber Engineering, Jun. 2018, 13 pages (downloaded from https://eng.uber.com/h3/).
PCT/US2018/066894—International Search Report and Written Opinion dated Sep. 6, 2019, 9 pages.
Spyrou et al., "Analyzing Flickr metadata to extract location-based information and semantically organize its photo content," Neurocomputing, vol. 172, pp. 114-133, Jan. 8, 2016.
Van den Assem, D. C. F., "Predicting Periodic and Chaotic Signals using Wavenets", Aug. 18, 2017, 90 pages.
Chen, Tianqi, et al., "XGBoost: A Scalable Tree Boosting System", ACM SIGKDD Conference of Knowledge Discover and Data Mining, Aug. 13-17, 2016, 10 pages.
PCTUS2018052032—International Search Report and Written Opinion dated May 24, 2019, 13 pages.
U.S. Appl. No. 16/112,589—Notice of Allowance dated Jul. 1, 2019, 9 pages.
U.S. Appl. No. 16/112,589—Notice of Allowance dated Nov. 22, 2019, 12 pages.
U.S. Appl. No. 16/567,422—Office Action dated Feb. 26, 2020, 12 pages.
U.S. Appl. No. 16/567,422—Response to Office Action dated Feb. 26, 2020, filed May 26, 2020, 8 pages.
U.S. Appl. No. 16/567,422—Office Action dated Aug. 31, 2020, 21 pages.
U.S. Appl. No. 16/567,422—Notice of Allowance dated Dec. 2, 2020, 8 pages.

* cited by examiner

300

| Res | Mode | Res./edge | Resolution | Base cell |
|---|---|---|---|---|
| Base cell | | Digit 1 | Digit 2 | Digit 3 | Digit 4 |
| Digit 5 | Digit 6 | Digit 7 | Digit 8 | Digit 9 | Digit 10 |
| Digit 11 | Digit 12 | Digit 13 | Digit 14 | Digit 15 |

FIG. 3

SYSTEMS AND METHODS FOR GENERATING MULTI-PART PLACE IDENTIFIERS

FIELD OF THE TECHNOLOGY DISCLOSED

The technology disclosed relates to generating universal identifiers for physical places and using such identifiers for sharing and accessing data related to physical places.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

A place-of-interest or a place can be referred to across various data sets by name, address, geocode or any number of different identifiers provided by respective data providers. The addresses or names of a same place can be stored differently in different databases, thus causing problems to users who want to collect data for places from different data sources. Often these pieces of information regarding a place-of-interest (POI) are messy and unstable over time. For example, a business may change its name, a street name may be changed, etc. Further, some pieces of information are not unique to a given piece of information, e.g., a new business moves in at an address. Some pieces of information may not be present for all places, e.g., a park without a street address.

Geocoding systems can identify location of a place on the surface of the Earth. For example, latitude and longitude pairs can be used to identify location. The latitude and longitude pairs identify location along a continuum rather than a region. Grid-based geocoding systems such as H3 available at <h3geo.org/docs>, Geohash presented at <en.wikipedia.org/wiki/Geohash>, Open Location Code available at <github.com/google/open-location-code>, S2 Geometric Library available at <code.google.com/p/s2-geometry-library/>, etc., can be used to identify a geometric boundary. The H3 grid system uses hexagon-shaped regions to tile the surface of the Earth. Other geocoding systems can use rectangular-shaped regions to tile the surface of the Earth. A hexagon or a rectangular region can contain tens to thousands of places-of-interest or businesses. The location information from such geocoding systems cannot be used to uniquely identify a business or a POI. Other pieces of information need to be combined with location information from geocoding systems to uniquely identify a business or a POI.

An opportunity arises to generate a standard universal identifier for all physical places so that information pertaining to those places can be shared easily across different organizations and data sets.

BRIEF DESCRIPTION OF THE DRAWINGS

FIG. 3 presents bits encoded for a multi-part place identifier in a bit layout of an H3 index.

DETAILED DESCRIPTION

Figure 1:
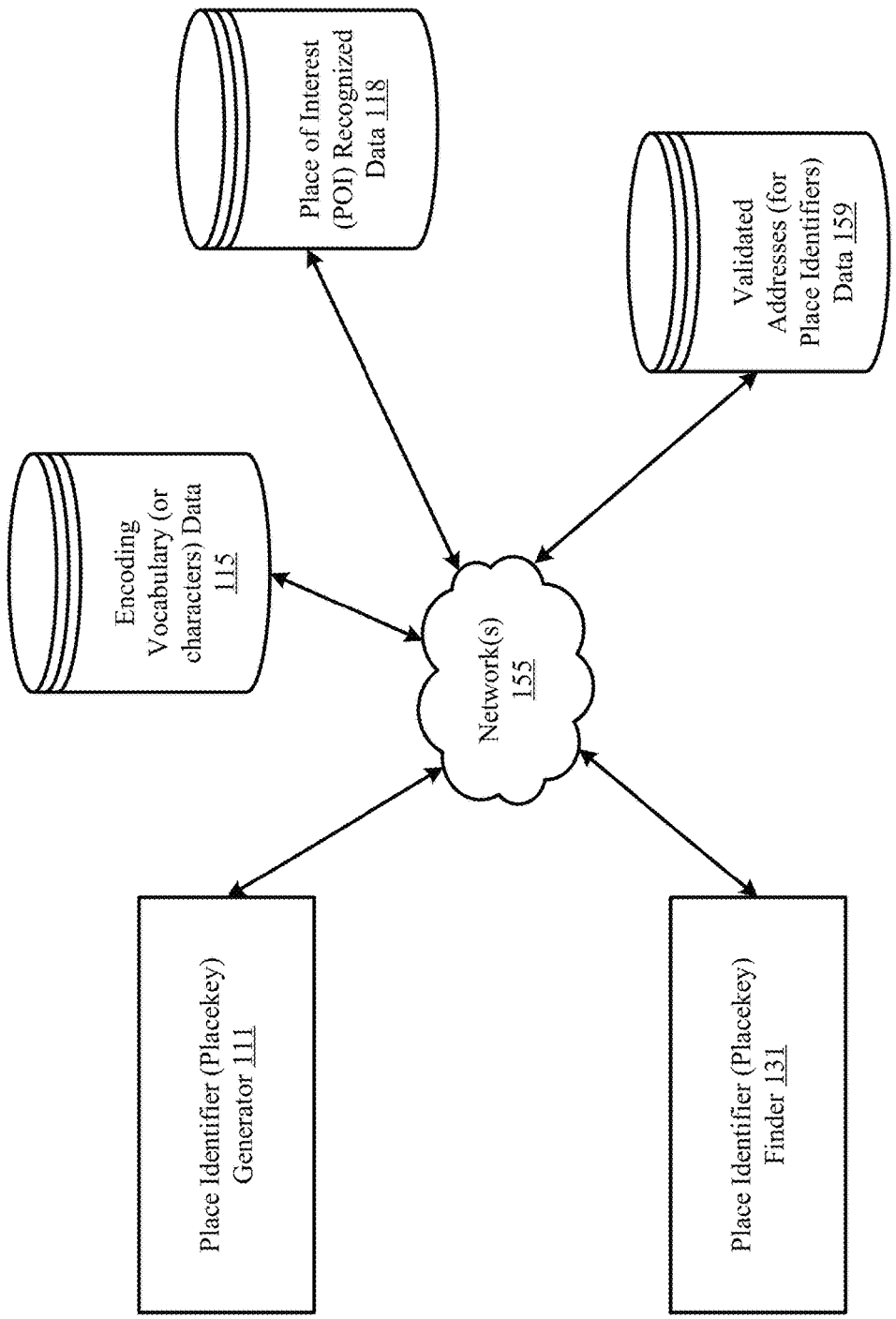
FIG. 1 illustrates a block diagram of an example environment for generating and accessing multi-part place identifiers.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

A physical place is usually identified by an identifier such as a name, an address, or a geocode, etc. These identifiers can be maintained by separate organizations or sources. Thus, the identifiers are not standardized and can even change over time. For example, source A may indicate that the name for a place located at 1000 5th Ave, New York, NY 10028, U.S.A. is "The Met" while source B may indicate that the name is "The Metropolitan Museum of Art." Sources A and B may also have conflicting information for the geospatial coordinates and other metadata attributes. Source C may have an incomplete address for the place with the name "The Metropolitan Museum of Art," such as "5th Ave, New York, NY 10028, U.S.A". The differences or mismatches between identifiers of a same place from different sources can obstruct gathering of data for the same place from different data sources or data sets.

The technology disclosed presents systems and methods for generating standardized identifiers for places. The place identifier generated by the technology disclosed consists of two parts, a "Where" part and a "What" part joined together by a joining symbol "@" forming "What@Where" multi-part place identifier. The two-part place identifier is also referred to as a "Placekey". The What part is an optional prefix, therefore, every Placekey has at least a Where part.

The technology disclosed can address the above-mentioned mismatch between identifier of same place from different data sources in at least two possible ways. Firstly, the technology disclosed enables matching or joining place-of-interest (POI) data from one data source to POI data from other data sources. The POI data is encoded in the What part of the multi-part place identifier. Secondly, the technology disclosed encodes geographical location (e.g., latitude/longitude) of the place-of-interest in the Where part of the multi-part place identifier. This enables joining of POI data with non-POI data (which does not include place name or other such identifiers). Examples of non-POI data include weather, evaluation, population, etc. Placekey or multi-part place identifier can serve as a standard universal identifier for any physical place, so that information pertaining to those places can be shared easily across different users, organizations, and data sets.

Environment

We describe a system for generating a multi-part place identifier with at least one part. The system is described with reference to FIG. 1 showing an architectural level schematic of a system in accordance with an implementation. Because FIG. 1 is an architectural diagram, certain details are intentionally omitted to improve the clarity of the description. The discussion of FIG. 1 is organized as follows. First, the elements of the figure are described, followed by their interconnection. Then, the use of the elements in the system is described in greater detail.

FIG. 1 includes the system 100. This paragraph names labeled parts of system 100. The figure illustrates a place identifier (or Placekey) generator 111, a place identifier (or Placekey) finder 131, an encoding vocabulary (or characters) database 115, a place-of-interest (POI) recognized database 118, a validated addresses database 159, and a network(s) 155. The network(s) 155 couples the place identifier generator 111, the place identifier finder 131, the encoding vocabulary database 115, the POI recognized database 118, and the validated addresses database 159.

We now refer to FIG. 1 to provide description of components of the system 100. The place identifier generator 111 includes logic to generate a multi-part place identifier with at least one part. As mentioned above, the place identifier or Placekey can consist of two parts: a What part, which is optional and a Where part. The What part is further composed of two parts: an address encoding and a place-of-interest (POI) encoding. In one implementation, both the address encoding and the POI encoding are a three-character (or digit) alpha-numeric sequence. In other implementations, the length and composition of address encoding and POI encoding can change.

The first part of What part of multi-part place identifier is an address encoding. The address encoding is assigned based on a validated address (e.g., CASS validated address) for a place. The system can store validated addresses and corresponding multi-part place identifiers in the validated addresses database 159. The address encoding is assigned incrementally, i.e., for a first place at a given validated address, the address encoding can be "222". This encoding example is illustrated using an encoding vocabulary that starts with a character "2" in the sequence of alphabets of the vocabulary. The address encoding is independent of the place name and is dependent on the location address. If the address is not validated such as a place that does not have a mailing address (e.g., a park, etc.) then the system can assign a default address encoding (such as "zzz") to that place.

The second part of What part of multi-part place identifier is a POI encoding. The system includes logic to generate a POI encoding or a POI identifier for a place name. The system can also access the POI recognized database 118 to match the input place name to determine if a POI identifier already exists for this place. If the POI encoding or identifier exists, the system can use that in the Placekey, otherwise the system can generate the POI identifier. The benefit of the POI encoding is that it allows the system to point to a specific POI that existed at a certain time at a certain address. There can be multiple business at a particular address such as a coffee shop inside a shopping store. Further, the multiple businesses can exist at a particular location over time such as a particular restaurant is replaced another restaurant at the same location. If the address encoding in the What part is "zzz", the POI encoding can distinguish this identifier for a given Where part in the multi-part place identifier.

The second part of the multi-part place identifier is a nine-character alpha numeric sequence, referred to as Where part. As the What part is optional, a multi-part place identifier consisting of only a Where part refers to region on the Earth. The Where part is assigned to a place based on the position of the place in a geometrical boundary on the Earth. In one implementation, the Where part of the multi-part place identifier encodes a hexagon of approximately 15,000 square meters on the surface of the Earth. The hexagons can have an edge length of 66 meters on average. The exact area and edge length of the hexagon varies by location. The hexagons are given by a resolution of 10 in H3 indices, further details are available at <h3geo.org>. Different resolutions greater than or less than 10 can be used by the technology disclosed. Resolution greater than 12 are not desirable for the technology disclosed as the area encompassed by the geometrical boundary is under 1 square meters at this resolution in H3 grid system. The place identifier generator 111 can calculate a geocode (latitude and longitude) for a validated location address. The geocode is then mapped to a hexagon. The nine-character encoding of the hexagon forms the Where part of the multi-part place identifier. The What part and Where part are joined together by a joining symbol "@" to form the multi-part place identifier.

The technology disclosed, in one implementation, can use a vocabulary of 28 characters "23456789bcdfghjkmnpqrstvwxyz" for encoding the What and Where parts of the multi-part place identifiers. The system can use other alphabets for encoding. Some alphabets such as vowel alphabets "a", "e", "u" are reserved as special characters for encoding. The system can store the vocabulary in the encoding vocabulary (or characters) database 115. Some visually similar characters such as "O" and "0", or "1" and "l" are not included in the vocabulary to avoid making encoded values harder to read. Similarly, excluding mixing of upper and lower case letters and taking vowel characters (a, e, i, o, u) out of the vocabulary reduces possibility of forming undesirable or offensive words in the encoded What and Where parts.

Completing the description of FIG. 1, the components of the system 100, described above, are all coupled in communication with the network(s) 155. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as user-name/password, Open Authorization (OAuth), Kerberos, Secured, digital certificates and more, can be used to secure the communications.

Placekey Examples

There are a number of ways to convey information about a location on Earth. Latitude and longitude pairs are commonly used for this purpose. They define locations along a continuum rather than a region. Therefore, multiple pairs of coordinates will be required to specify a region. A desirable property of latitude and longitude is that it is easy to tell relative spatial relationships between multiple points (often referred to as "proximity"). This motivates the use of hierarchical system for geocoding. This results in nearby locations outside of the boundary having similar codes.

H3 indices uses a hexagonal grid system. The rectangular grid systems can breakdown at the poles where triangles need to be used. H3 system handles the grid breakdown by starting with an icosahedral projection of the surface of the Earth i.e., a 3D shape with 20 faces and 12 vertices. Each face can be regularly tiled by hexagons. Another benefit of H3 over other grid-based systems is the adjacency of cells. In a hexagonal structure, each cell has six neighbors with which it shares its edges. In case of a rectangular grid, each cell has four neighbors with which it shares its edges and four neighbors with which it only shares a vertex. The centers of the edge-sharing neighbors are closer to the center of the given cell than the vertex-sharing neighbors. The simpler adjacency structure of hexagonal grid system makes analyses of spatial data easier than with rectangular grids. Finally, H3 hexagonal grid system has low distortion of hexagons across the surface of Earth when compared to other grid systems. We now present examples of encoding of hexagonal structures of H3 grid system in multi-part place identifiers.

Figure 2A:
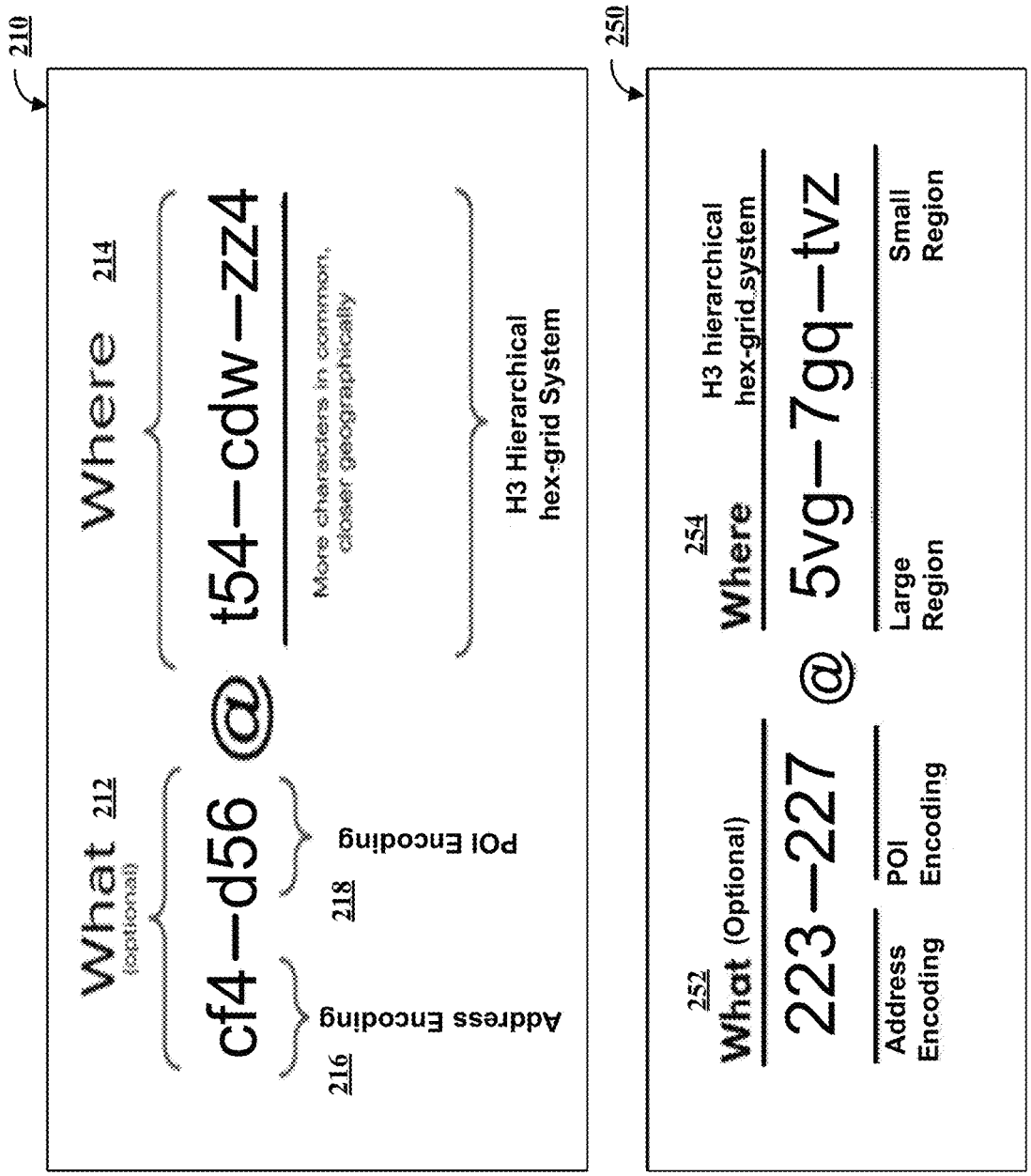
FIG. 2A presents examples of multi-part place identifiers including What and Where parts.

FIG. 2A presents examples of multi-part place identifiers also referred to as Placekeys. The first example presents a Placekey 210 comprising of a What part 212 and a Where part 214. The What part further comprises of address encoding 216 and place-of-interest (POI) encoding 218. The address encoding 216 is a three-character alpha numeric sequence "cf4" in base-28 i.e., using 28 alpha numeric characters in the vocabulary presented above. The second part of What part of Placekey is a place-of-interest encoding 218 which is a three-character alpha numeric sequence "d56". The What part 212 "cf4-d56" is formed by joining the address encoding 216 and the POI encoding 218. We can see that What part 212 is optional. A Placekey for a place can be generated without the What part, consisting of only the Where part 214.

The Where part 214 is a nine-character alpha numeric sequence "t54-cdw-zz4". The nine characters in the Where part 214 are arranged in three triplets for legibility. The Where part in a Placekey refers to a particular hexagon of space on the surface of Earth. In one implementation, the technology uses the H3 hierarchical hex grid system to position places on surface of Earth.

The second example Placekey 250 includes a What part "223-227" (labeled 252) consisting of address encoding and POI encoding of three characters each, respectively. The address encoding and POI encoding can accommodate slightly less than 22,000 values (string length of 3 with 28 possible characters at each position, 28*28*28 or 21,952 possible values). This means that for each Where part there are about 428 million What part values. In the United States, there are typically less than twelve hundred addresses per Where value (at a resolution of 10 using the H3 hex-grid system). Similarly, there can be 21,952 POI values per Where value. Therefore, the What part of the multi-part place identifier can accommodate changes to place names due to moving of existing businesses and opening of new businesses at the same place.

The Where part "5vg-7gq-tvz" (labeled 254) of the place identifier 250 is joined to the What part using "@" symbol. The triplets in the Where part do not explicitly code exact spatial distances. However, the codes do become more specific when reading from left to right. Two Where parts can be evaluated for proximity based on the length of their shared prefix as shown in Table 1.

TABLE 1

| Length of Shared Prefix | Maximal Distance (meters) |
| --- | --- |
| 0 | 2.004e7 |
| 1 | 2.004e7 |
| 2 | 2.777e6 |
| 3 | 1.065e6 |
| 4 | 1.524e5 |
| 5 | 2.177e4 |
| 6 | 8.227e3 |
| 7 | 1.176e3 |
| 8 | 4.443e2 |
| 9 | 6.347e1 |

Figure 2B:
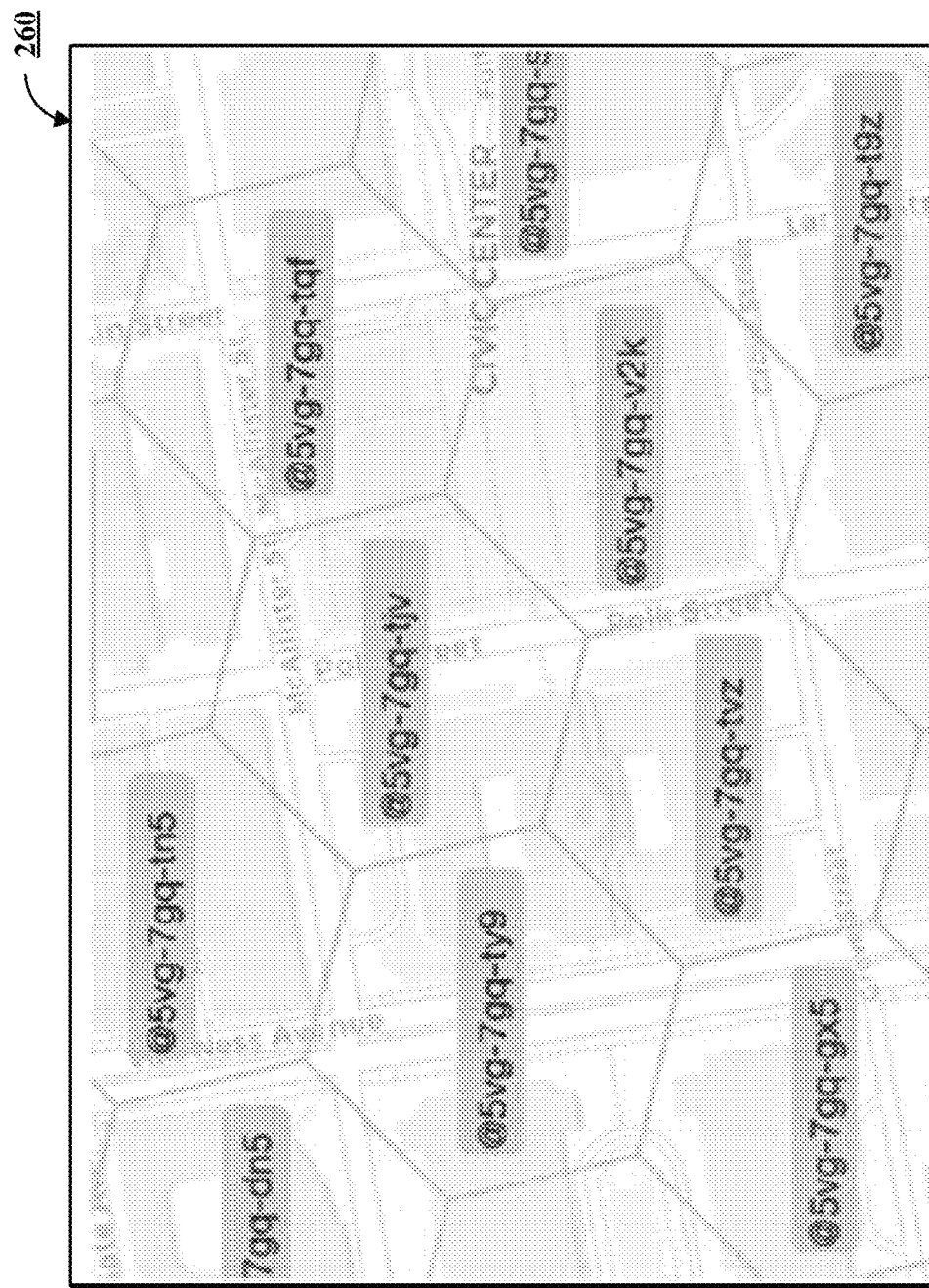
FIGS. 2B and 2C present examples of hexagonal geometrical boundaries encompassing location addresses and their respective alpha-numeric encodings.

As shown in Table 1 above, as the number of shared prefixes between two Placekeys increase, they are positioned closer to each other. FIG. 2B (labeled 260) shows Placekey grid cells that are positioned close to each other and share prefixes.

Figure 2C:
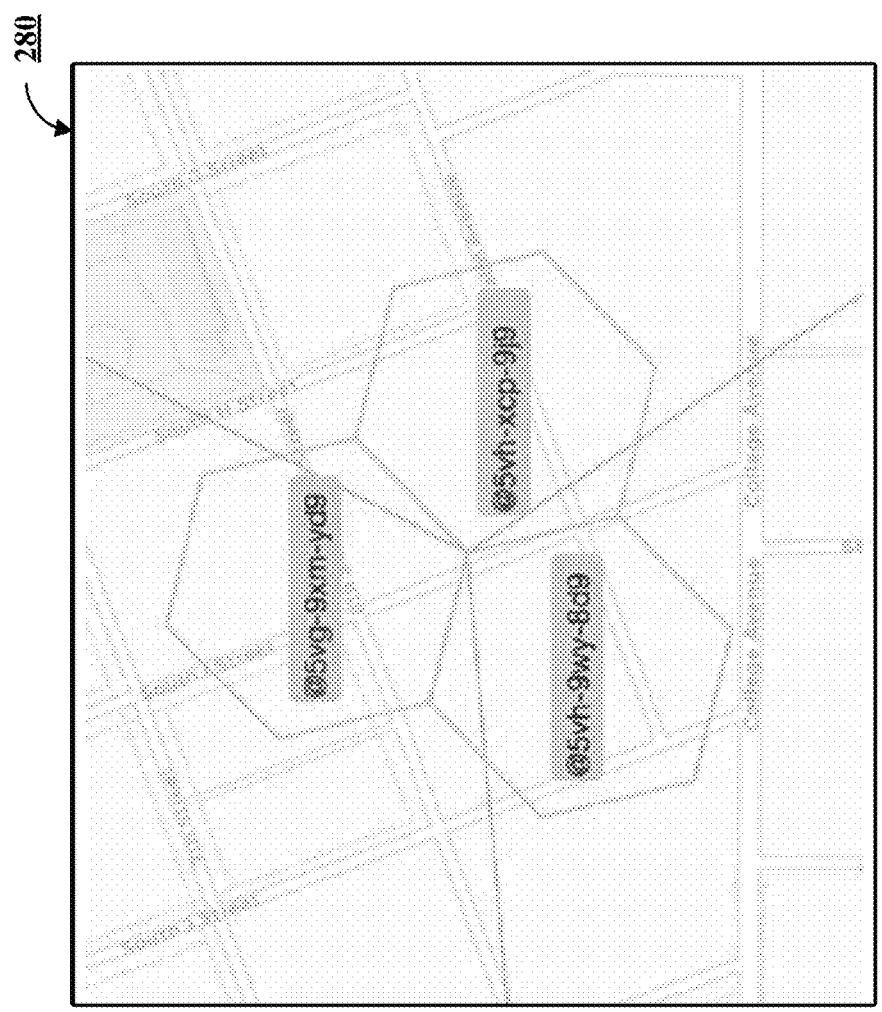

In some situations, nearby hexagons may have codes that are not very similar. This can occur when Placekey grid cells are near edges of larger (i.e., lower resolution) hexagons in H3's spatial hierarchy. FIG. 2C (labeled 280) shows three neighboring Placekeys whose shared vertex is also shared by three resolution 5 (coarser) hexagons. The hexagons with resolution 5 have edge length of around 8.5 km. Each Placekey hexagon is nested under the resolution 5 hexagon that contains most of its area which is why their encodings are different.

Placekey Encoding

We now present some details of encoding the Where and What parts of the multi-part place identifier. The Where part of the Placekey has 9 characters. The system can use character "a" to left pad the Where part to increase the length of alphabets in the sequence to nine characters in case fewer alphabets (or digits) are required for encoding. The most significant bits in a Where part correspond to H3 base cells. There are 122 base cells requiring 2 characters (or digits) to describe in base 28. We can think of the first three digits of a Where part that start with the letter "a" in the same way as we think of an integer that starts with "0". For example, "a4t" is the same value as "4t" in our encoding of the Where part. In the What part encodings "2", the first letter in the character set is used for padding. For example, "222" corresponds to the first encoded value for either the Address or POI encoding.

FIG. 3 presents bit layout of H3 index and indicates the bits that are encoded for multi-part place identifier (or Placekey). When encoding H3 indices the system does not encode the entire 64-bit integer. The system encodes 43 bits of the integer plus a constant. We do not need to encode the first 12 bits because these encode metadata about the index that does not contain location information. The last 9 bits of the H3 index encode location information at a higher precision (resolutions 13 to 15) than required for Placekey. The truncated bits are constant across all H3 indices used for Placekey. Therefore, their removal does not impact the one-to-one relationship between Where parts and the resolution 10 H3 indices. The system can add a constant shift in the value of H3 base indices by 1 which can reduce the amount of padding required to an encoded index having 9 characters. The H3 bits in shaded boxes in illustration 300 are encoded for Placekey.

System Components

Figure 4:
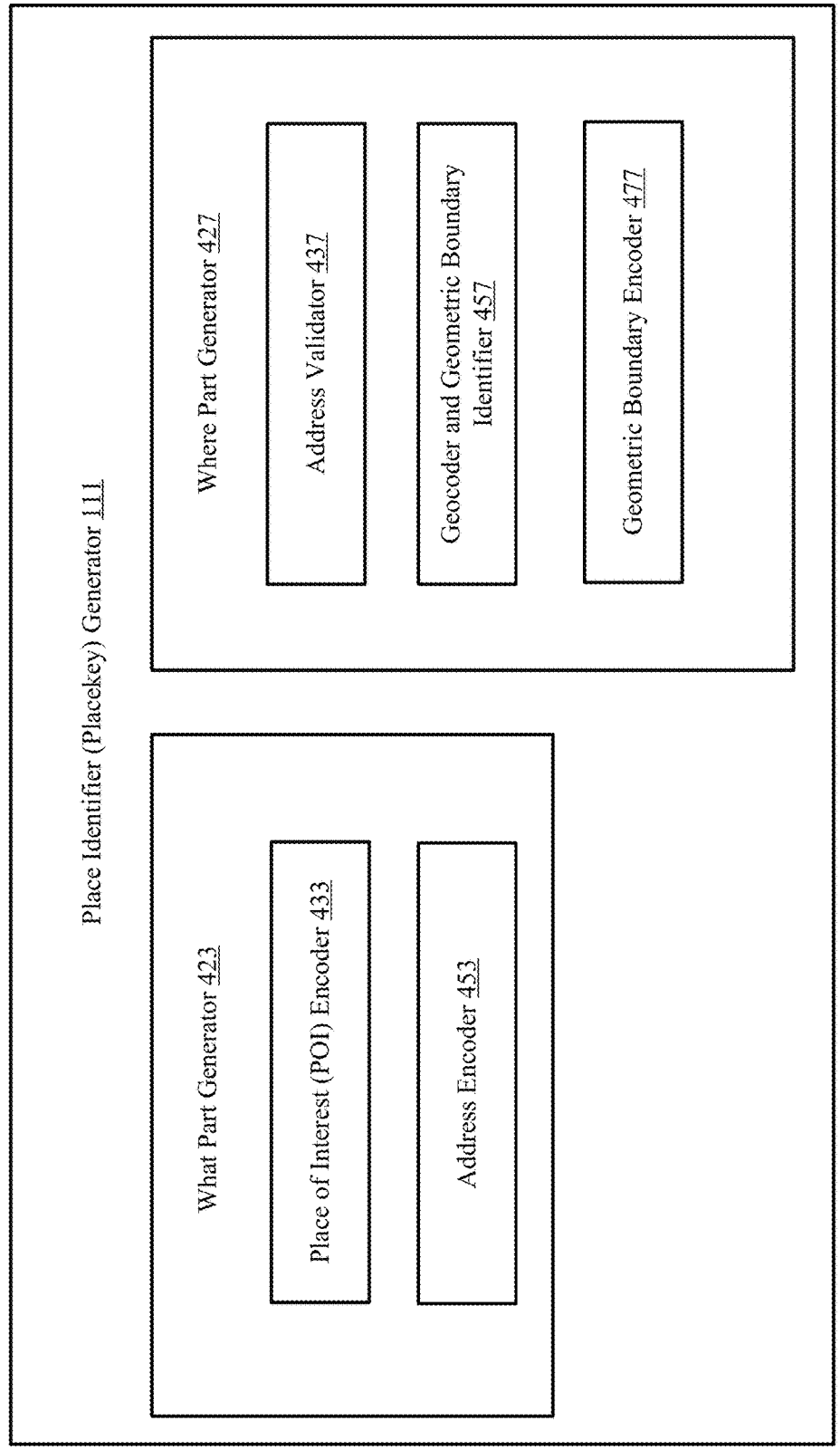
FIG. 4 presents high-level components of the system to generate multi-part place identifiers.

FIG. 4 presents high-level components of the place identifier generator 111. The system components are organized into What part generator 423 and Where part generator 427. The What part generator 423 comprises of a place-of-interest (POI) encoder 433 and an address encoder 453. The Where part generator 427 comprises of an address validator 437, a geocoder and geometric boundary identifier 457 and a geometric boundary encoder 477. The illustrated components can be merged or further separated, when implemented. We now present details of the logic implemented by the components of the place identifier (or Placekey) generator 111.

What Part Generator

The What part generator includes logic to encode a validated address to determine an address encoding for the location address within the geometrical boundary of the Where part of the multi-part place identifier. The What part generator can include a place-of-interest (POI) encoder 433 component and an address encoder 453 component.

Place of Interest (POI) Encoder

The place-of-interest (POI) encoder 433 includes logic to encode the name for a place-of-interest located at the validated address. The system can store POI codes or POI identifiers in the place-of-interest recognized database 118. When the system receives an input name with an address for generating a POI identifier, the system includes logic to first query the POI database 118 to determine if a POI identifier exists for this place. If the POI identifier exists, then the system can use the stored POI identifier instead of generating a new POI identifier for this place. Otherwise, the system can generate a new POI identifier.

The POI identifier enables the system to point to a specific place (such as a business) that existed at a certain time at a certain address. Even though the address encoding in the What part identifies a particular address, there can be multiple businesses at the time same time e.g., a coffee shop inside a shopping store or a supermarket. Similarly, multiple businesses can exist at a specific location over time, for example, a restaurant is replaced by another restaurant. The system assigns POI identifiers or POI encodings for a given Where part for a given address encoding in a sequential manner. For example, for a Where part of "bcc-444-tvb" with an address encoding of "4bc", the first POI can be "222". The complete Placekey for this place-of-interest can be 4bc-222@bcc-444-tvb.

Address Encoder

The address encoder 453 includes logic to determine an address encoding for a location address within the geometrical boundary of the Where part of the multi-part place identifier. The system assigns address encoding upon receiving a validated address for example by using coding accuracy support system or CASS validated address for a place. The system includes logic to store validated addresses in the validated addresses database 159. When the address encoder receives a validated address, the system queries the validated addresses database 159 to find if the address encoding already exists. If the address encoding does not exist, then the system can generate new address encoding for this address. The address encoding is assigned incrementally. The first place for a given Where part can have an address encoding of "222" as "2" is the first character in the vocabulary used by the system.

If an address is corrected so that it does not map to the same canonicalized address, the address encoding can be changed. We refer to a canonicalized address as an address that is parsed into a specific format. For example, an address with a number separated by a street name in lower case, region in a given abbreviation e.g., CA, NY, etc. If a canonicalized address does not match an address stored in the address database, a new address encoding is generated. This means that the Placekey will change. If the changed address still maps to the same canonicalized address stored in the database, then the address encoding and the Placekey are not changed. The system can assign a default address encoding of "zzz" when there is no address for the place name for example, a park, a monument, an entire city, or any other public place without a validated location address. The reserved address encoding "zzz" can be used along with a POI encoding to reference the place without an address and store the respective Placekey the validated addresses database 159 or another database to store the addresses. The reserved address encoding "zzz" is not used without a POI encoding as the system can refer to a hexagon of space without an address by including only a Where part in the Placekey e.g., "@4rt-5yj-22s". Therefore, by reserving one or more default address encodings (such as "zzz"), the technology disclosed can generate Placekeys for places that do not have an address such as landmarks, cities, etc.

A Where part represents a large area (e.g., about three football fields at a resolution 10 of H3 grid system). The address encoding provides a way to distinguish between places in a Where part. The technology disclosed can create up to 21,952 address encodings for each Where part with an address code length of 3 and 28 alphabets or characters in the vocabulary. This number of address encodings are sufficient for large apartment buildings or shopping malls with many residences or business.

Where Part Generator

The Where part generator 427 includes logic to generate or assign an already generated Where part to a place. A Where part is assigned to a place based on the centroid of that place. In other implementations, the technology disclosed can assign Where part based on other positions or locations in a place such as closer to centroid by a predefined distance. The Where part generator 427 further comprises an address validator 437, a geocoder and geometric boundary identifier 457 and a geometric boundary encoder 477.

Address Validator

The address validator includes logic to validate an address. The Where part of a Placekey is generated for a geocode (or a latitude and longitude pair) which is the center of a validated address. In another implementation, the system can generate a Where part for any latitude and longitude pair. The system can use CASS (coding accuracy support system) validated addresses which are used by United States Postal Services (USPS). The system can also use other address validation systems to validate an address before generating a Where part. The system can use third party address validation systems to validate an address before generating a What part. The system can access or use address validation services provided by postal services of other countries. The system can also check an address from a trusted third-party address database. For example, if an address is in the National Address Database available at <transportation.gov/gis/national-address-database/national-address-database-0>, the system can use this address for address encoding.

Geocoder and Geometric Boundary Identifier

The geocoder and geometric boundary identifier 457 includes logic to calculate a geocode (latitude/longitude) for the location address of the place and use the geocode to identify a geometrical boundary encompassing the location address or centroid of the location address. The technology disclosed can use external services e.g., TIGER address geocoding available at <usna.edu/Users/oceano/pguth/md_help/html/tiger_address_geocode.htm> to determine latitude and longitude for an address. The latitude and longitude pair for the address is mapped to a hexagon in the H3 grid system at a desired resolution level. The technology disclosed can use resolutions between 10 to 12 H3 indices for practical applications for residential and business locations. At a resolution 10, the hexagon sizes are approximately 15,000 square meters on the surface of Earth. In one implementation, the system assigns the geocoded location of a place to a hexagon based on the centroid of the place. The technology disclose can take the latitude and longitude values of a location of a place and determine which hexagon in the H3 grid contains that point. For example, the system can use a library provided by H3 grid system to find a hexagon encompassing a location identified by a latitude and longitude pair.

The technology disclosed can use other geocoding systems in place of H3 grid system. For example, Geohash, presented at <en.wikipedia.org/wiki/Geohash>, Open Location Code (also known as Plus Codes) available at <github.com/google/open-location-code>, S2 Geometric Library available at <code.google.com/p/s2-geometry-library/>, etc. These systems can use a rectangular grid system to tile the globe. As with H3 grid system, these grid systems are not completely regular since rectangles and hexagons can tile a plane but not a sphere. In case of rectangular grid systems, the grid breaks downs at the poles where triangles need to be used instead of rectangles. We present H3 grid system as an example to explain generation and matching of multi-part place identifiers.

Geometric Boundary Encoder

The geometric boundary encoder 477 includes logic to convert the identified geometric boundary to an alphanumeric identifier forming a Where part of multi-part place identifier. The geometric boundary identifier can take the identified hexagon by the geometric boundary identifier and encode that to a Where part. The Where part is a 9 digit (or character) encoding of an H3 hexagon at resolution 10. The system can encode hexagons up to resolution 12 in H3 grid system. There are 28 possible characters that can be used for encoding the hexagon in a Where part as mentioned above. The vocabulary is stored in the encoding vocabulary database 115. The system can use other vocabularies with more than 28 characters or less than 28 characters to encode the hexagon to a Where part. In one implementation, the vocabulary is case insensitive. The characters are selected to avoid ambiguity e.g., between alphabet "O" and number "0". Hence, these two characters are not included in the vocabulary.

The technology disclosed includes logic to encode locations to reflect their proximity. The further the places are from one another, the more digits in the Where part differ in their respective Where part identifiers. For example, two adjacent places might have Where parts of t54-cdw-zz4 and t54-cdw-zzr with only the last digit of their respective Where parts differing from each other. In another example, the two places can be a bit further apart from one another and can have more digits at the end that differ, for example, t54-cdw-zz4 and t54-edw-z4r.

All multi-part place identifiers (or Placekeys) have a Where part. A Placekey with just a Where part can be used to label data that only have to do with the hexagon itself, such as weather data, population, elevation, etc. The technology disclosed includes logic to map a Where part to an H3 hexagon. The system can also determine a parent H3 hexagon from a Where part value. The system includes logic to calculate a distance $y(x)$ between two Where parts when the two Where part have x number of digits (or characters) as common between the two identifiers. The Where part proximity detection feature can enable users to determine if two places are closer to each other based on the number of characters they have in common from left to right.

Multi-Part Place Identifier Generation API

Figure 5:
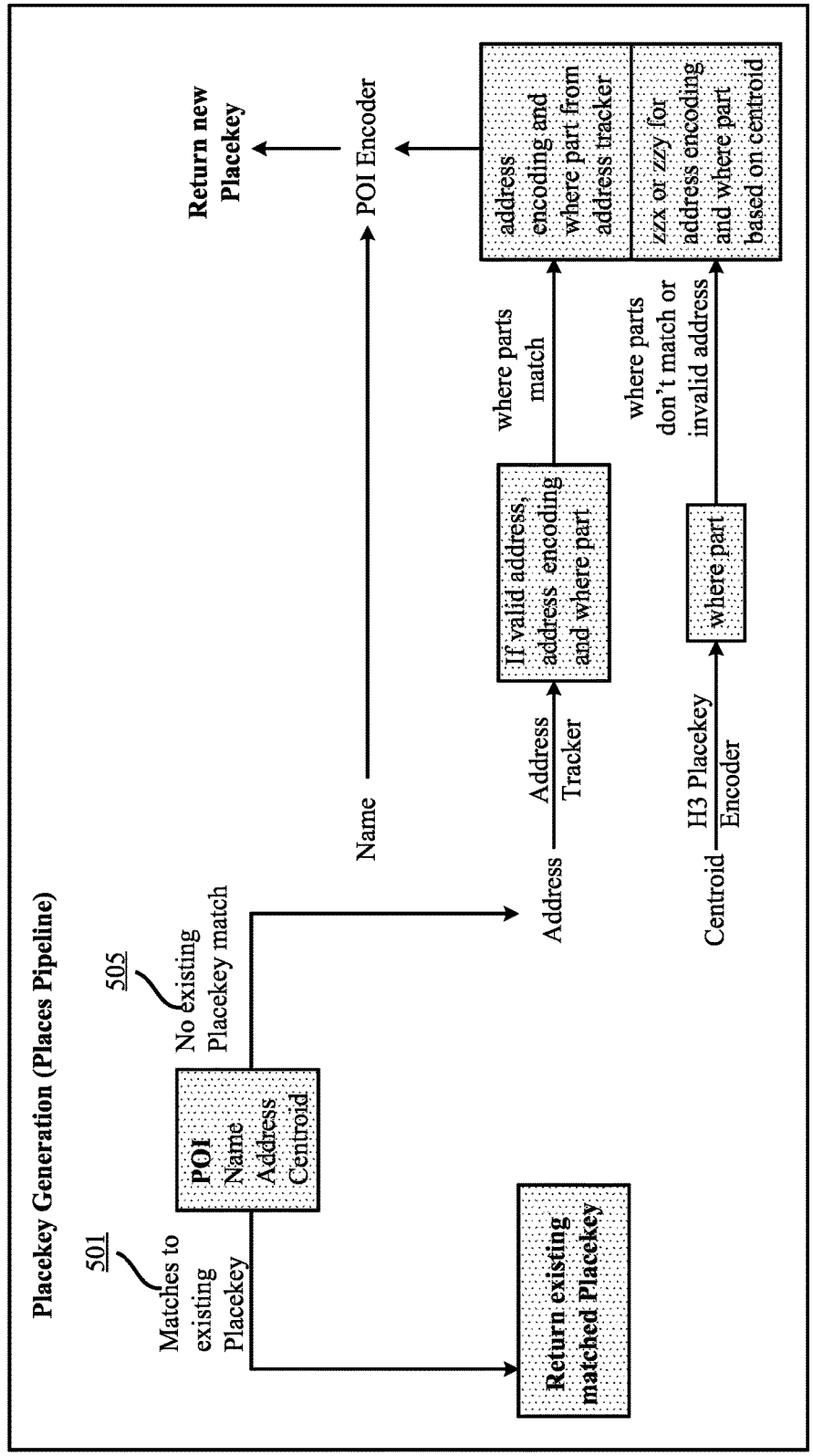
FIG. 5 presents an example implementation for generation of multi-part place identifiers.

FIG. 5 presents an overview of an example implementation 500 of the technology disclosed in which the system generates a multi-part place identifier upon receiving a name and an address of a place-of-interest (POI). The system includes logic to query the POI recognized database and match the incoming name and address to an existing record. If the name and the address match to an existing record the system can return the multi-part place identifier from the matched record in the database as indicated by a label 501. If there is no matching record in the database, then the system includes logic to encode the name of the POI to determine the POI encoding. The address is validated by an address tracker. The address tracker includes logic to encode the validated address and determine address encoding and Where part. The system matches the Where part to a record in the database. The system uses the matched Where part from the database. The system can generate a What part of Placekey by combining the POI encoding and address encoding for the input address. The Placekey including the What part and Where part is returned to the requesting user or an external system. If the Where part does not match an existing record in the database or the address is invalid then the system can use a default address encoding of "zzz" or "zzy" and combine it POI encoding to form a What part. The What part is combined with a Where part generated based on the centroid of the location. In one implementation, the centroid can be provided as input to the system.

Multi-Part Place Identifier Matching API

Figure 6:
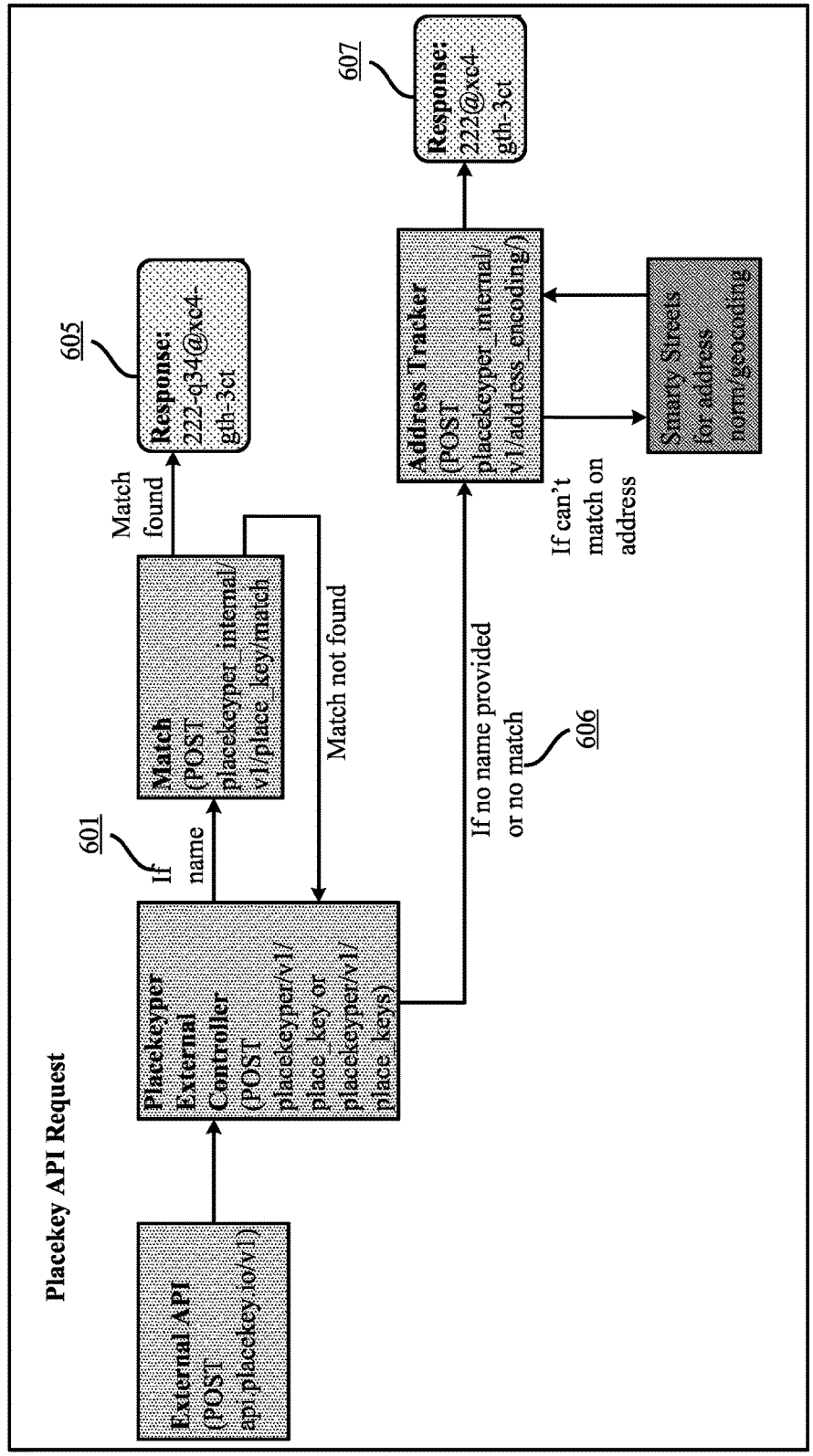
FIG. 6 presents an example implementation for matching of multi-part place identifiers.

FIG. 6 presents an overview of an example implementation 600 of the technology disclosed in which the system receives a request to find a multi-part place identifier. If the input request from a user or an external system includes a name (601) of the place-of-interest, the system matches the name with existing records in the POI recognized database. If a match is found, the Placekey is returned (605). If the name does not match to existing records in the database or no name is provided as input (606), the system calls address tracker to generate a new Placekey (607) as described above with reference to FIG. 5.

Process Flow for Generating Where Part of Placekey

Figure 7A:
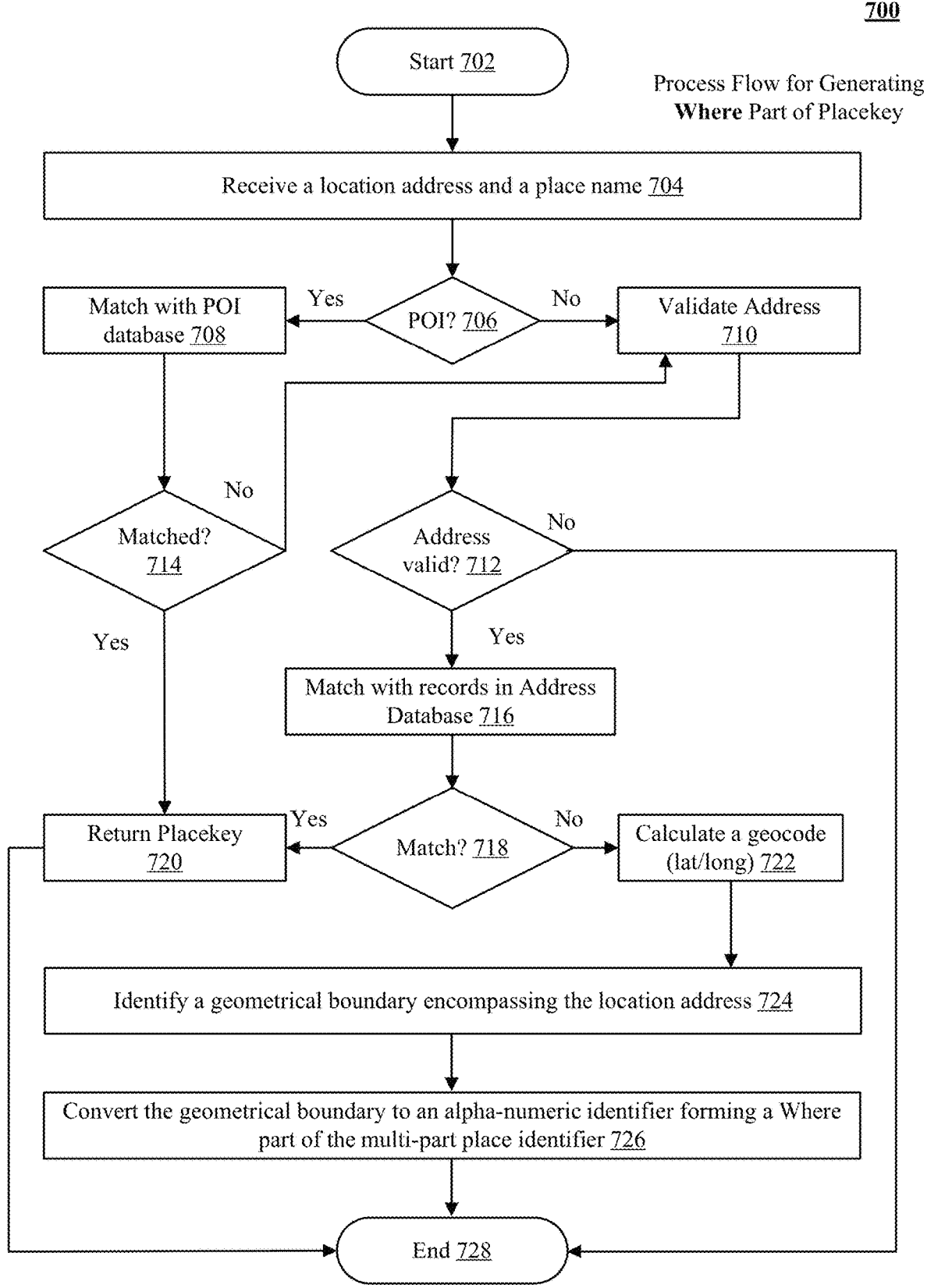
FIG. 7A presents a process flowchart for generating Where part of the multi-part place identifiers.

FIG. 7A presents an example process flow or flowchart 700 to generate Where part of a Placekey. The flowcharts presented herein, illustrate logic executed by the server, clients, or both. The logic can be implemented using processors programmed using computer programs stored in memory accessible to the computer systems and executable by the processors, by dedicated logic hardware, including field programmable integrated circuits, and by combinations of dedicated logic hardware and computer programs. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

The process in flowchart 700 starts at a step 702. The system receives a location address and a place name at a step 704. The system includes logic to check if the input contains a place-of-interest (POI) identifier (step 706) or whether POI identifier exists for the input name in the recognized POI database (step 706). The POI identifier is matched to records in the recognized POI identifiers database (step 708). If the POI identifier for the input name matches an existing record in the database (step 714), the system returns the Placekey for matched POI identifier from the database (720). If the POI identifier for the input name does not match to an existing record, the system validates the input address at a step 710. If the address is invalid (step 712), the process ends at a step 728. If the address is valid, the system matches the valid address with records in the address database (step 716). If the input address matches an existing record in the address database (step 718), the system returns the Placekey from the matched record. If the input address does not match an existing record in the address database, the system calculates a geocode (latitude and longitude) for the input address at a step 722. The system uses the geocoded address to determine a geometrical boundary (such a hexagon in the H3 grid system) encompassing the input location address (step 724). The system converts the geometrical boundary to an alpha-numeric identifier forming a Where part of the multi-part place identifier or the Placekey at a step 726. The process ends at the step 728.

Process Flow for Generating What Part of Placekey

Figure 7B:
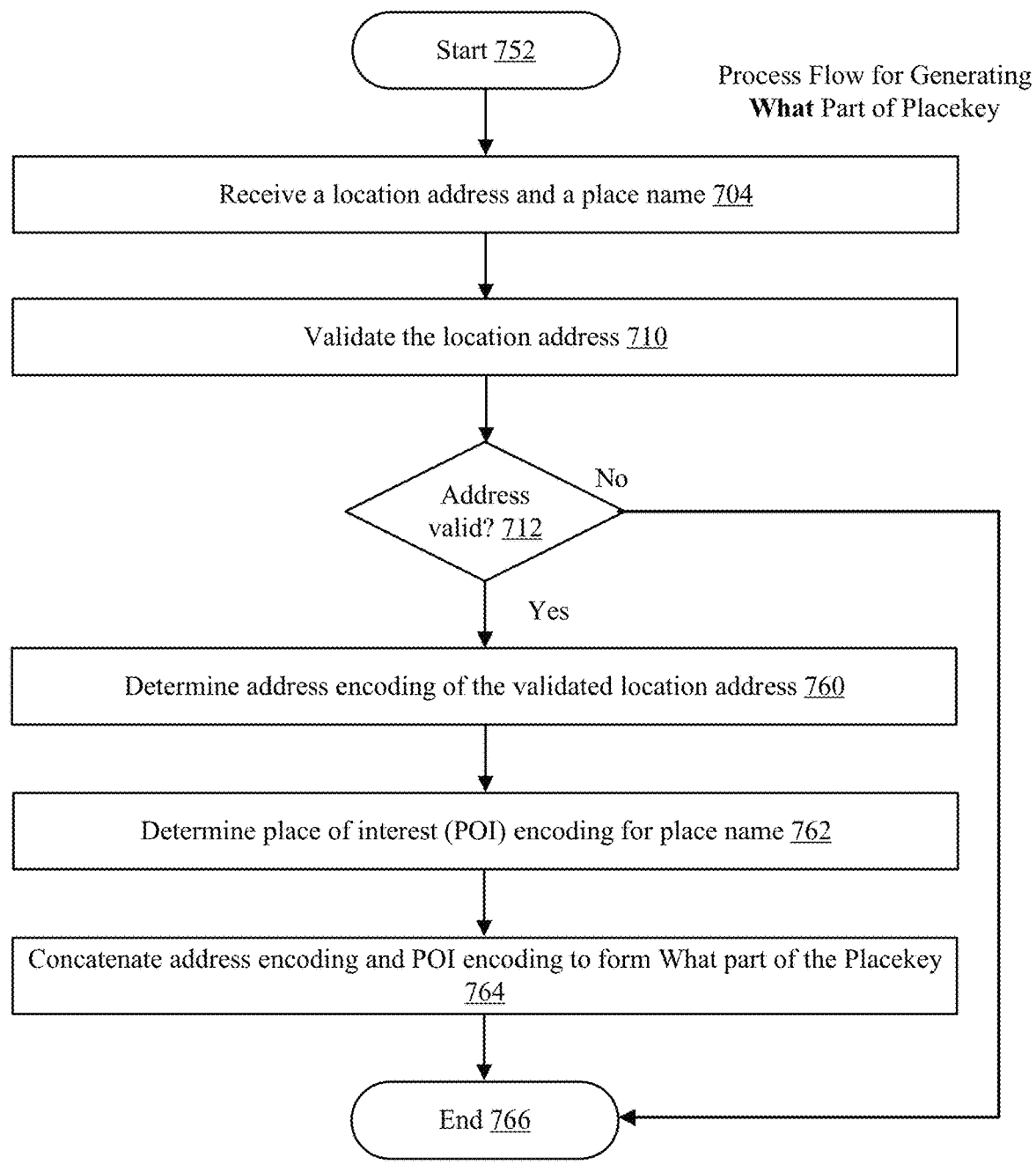
FIG. 7B presents a process flowchart for generating What part of the multi-part place identifiers.

FIG. 7B presents an example process flow or flowchart 750 to generate What part of Placekey. The process starts at a step 752. The process includes the process steps 704 and 710 as described above with reference to the process flow in FIG. 7A. At a step 712, the system checks whether the input address is valid or not. If the address is invalid, the process ends at a step 766. If the address is valid, the process continues at a step 760. The system determines address encoding of the validated location address at a step 760. The system determines a place-of-interest (POI) encoding for the place name at a step 762. The address encoding and the POI encoding is concatenated to form What part of the Placekey at a step 764. The process ends at a step 766.

Process Flow for Finding a Placekey

Figure 8:
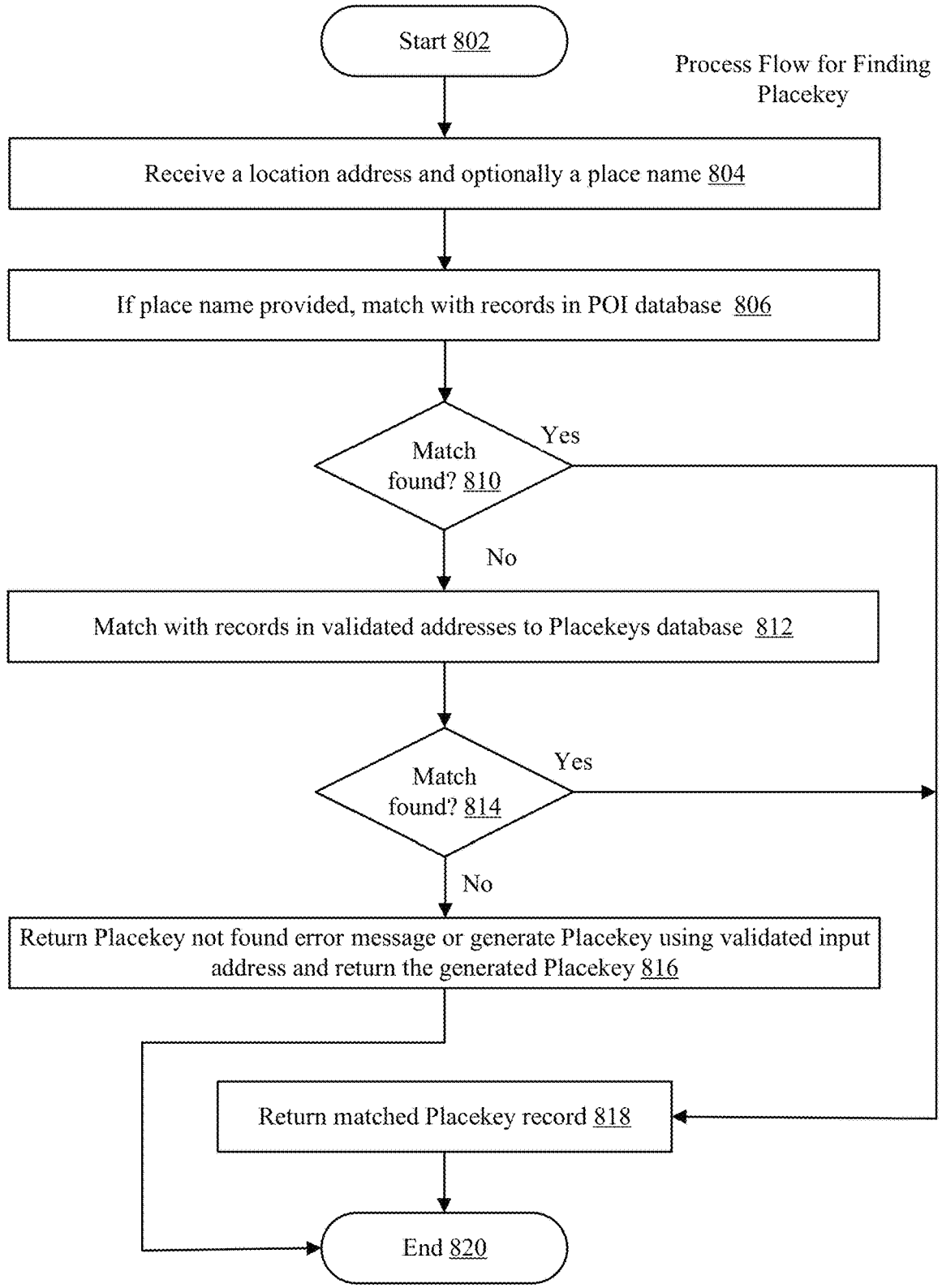
FIG. 8 presents a process flowchart for matching multi-part place identifier.

FIG. 8 presents an example process flow or flowchart 800 to find (or match) a Placekey for an input location address or a place name. The process starts at a step 802. At a step 804 the system receives a location address and a place name. In one implementation, the input of place name is optional. If the system receives a place name as input, the system includes logic to match the input place name with records in the POI database (step 806). If a matching record is found (step 810), the Placekey record in the matching record is returned (step 818). If a matching record is not found at the step 814, the system can generate a "Placekey not found" error message or generate a Placekey using validated input address as described above in FIGS. 7A and 7B. The system can then return the generated Placekey to the requesting user or external system (step 818). The process ends at a step 820.

Particular Implementations—Generating Placekey

We describe various implementations of generating a multi-part place identifier with at least one part.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A method implementation of the technology disclosed generates a multi-part place identifier with at least one part. The method includes receiving a location address and a place name. The location address can be a validated address (e.g., using coding accuracy support system or CASS). The method includes calculating a geocode (latitude/longitude) for the location address and using the geocode to identify a geometrical boundary encompassing the location address. The method includes converting the identified geometrical boundary to an alpha-numeric identifier forming a Where part of the multi-part place identifier. The method includes providing the multi-part place identifier with at least Where part to a user for use in further analysis.

This method implementation and other methods disclosed optionally include one or more of the following features. This method can also include features described in connection with systems disclosed. In the interest of conciseness, alternative combinations of method features are not individually enumerated. Features applicable to methods, systems, and articles of manufacture are not repeated for each statutory class set of base features. The reader will understand how features identified in this section can readily be combined with base features in other statutory classes.

The technology disclosed includes encoding the validated address to determine an address encoding for the location address within the geometrical boundary of the Where part of the multi-part place identifier. The method includes calculating a place or point of interest (POI) identifier for the place name located at the validated address and concatenating the address encoding with the POI identifier to form a What part of the multi-part place identifier. The method includes joining the What part with the Where part using a joining symbol to form the multi-part place identifier uniquely identifying the place name at the location address. The method includes providing the multi-part place identifier to a user for use in further analysis. This can include using the multi-part place identifier to access external databases containing attributes or information about the place name located at the location address.

The method includes using a default address encoding ("zzz") when there is no address for the place name and concatenating the default address encoding with the POI identifier to form the What part of the multi-part place identifier. The address encoding in the What part of the multi-part place identifier consists of a sequence of three alpha numeric characters.

The method includes calculating the address encoding in the What part of multi-part place identifier in base-28 using 28 alpha-numeric characters. In other implementations, the system can use a different vocabulary to encode the What part. In such implementations, the vocabulary can have more than 28 or less than 28 characters or digits.

The method includes accessing a database of place identifiers by matching the Where part of the multi-part place identifier. The method includes calculating an incremental place or point of interest (POI) identifier for the place name located at the validated address to form a first or What part of the multi-part place identifier for the matched Where part of the multi-part place identifier. The geometrical boundary encompassing the location address can be a hexagon. The Where part of the multi-part place identifier can consist of a sequence of nine alpha numeric characters.

The method includes calculating the Where part of the multi-part place identifier in base-28 using 28 alpha-numeric characters. In other implementations, the system can use a different vocabulary to encode the Where part. In such implementations, the vocabulary can have more than 28 or less than 28 characters or digits.

The method includes selecting a resolution level for the geometrical boundary encompassing the location address from at least three hierarchically arranged resolution levels (10, 11, 12).

The method includes accessing a database of place identifiers by matching the Where part of the multi-part place identifier. The method includes encoding the validated address to determine an incremental address encoding for the location address within the geometrical boundary of the matched Where part of the multi-part place identifier. The location address further including a number, street identifier, a city name, a region identifier, and a ZIP code.

Each of the features discussed in this particular implementation section for the first method implementation apply equally to all other method implementation, except where incompatible. As indicated above, all the method features are not repeated in subsequent methods and should be considered repeated by reference.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Computer readable media (CRM) implementations of the technology disclosed include a non-transitory computer readable storage medium impressed with computer program instructions, when executed on a processor, implement the methods described above.

Each of the features discussed in this particular implementation section for the method implementation apply equally to the CRM implementation. As indicated above, all the system features are not repeated here and should be considered repeated by reference.

A system implementation of the technology disclosed includes one or more processors coupled to memory. The memory is loaded with computer instructions to receive a location address and a place name. The location address can be a validated address (e.g., using coding accuracy support system or CASS). The system includes logic to calculate a geocode (latitude/longitude) for the location address and using the geocode to identify a geometrical boundary encompassing the location address. The system includes logic to convert the identified geometrical boundary to an alpha-numeric identifier forming a Where part of the multi-part place identifier. The system includes providing the multi-part place identifier with at least Where part to a user for use in further analysis.

Each of the features discussed in this particular implementation section for the method implementations apply equally to this system implementation, except where incompatible. As indicated above, all the method features are not repeated for the system above and should be considered repeated by reference.

Other implementations may include a non-transitory computer readable storage medium storing instructions executable by a processor to perform functions of the system described above. Yet another implementation may include a method performing the functions of the system described above.

A computer readable storage medium (CRM) implementation of the technology disclosed includes a non-transitory computer readable storage medium impressed with computer program instructions to generate a multi-part place identifier with at least one part. The instructions when executed on a processor, implement the method described above.

Each of the features discussed in this particular implementation section for the method implementation apply equally to the CRM implementation. As indicated above, all the method features are not repeated here and should be considered repeated by reference.

Particular Implementations—Matching Placekey

We describe various implementations of finding (or matching) a multi-part place identifier with at least one part.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A method implementation of the technology disclosed includes finding a multi-part place identifier with at least one part. The method includes receiving an input including an input location address and validating the input location address (e.g., using coding accuracy support system or CASS). The method includes accessing a database storing records of validated addresses and corresponding multi-part place identifiers using the validated address. The method includes matching the validated input address to an address in the stored records in the database and retrieving corresponding matched multi-part place identifier with at least a Where part. The multi-part place identifier includes an alpha numeric identifier indicating a geometrical boundary for the matched validated input address. The method includes providing the matched multi-part place identifier with at least the Where part to a user for use in further analysis.

This method implementation and other methods disclosed optionally include one or more of the following features. This method can also include features described in connection with systems disclosed. In the interest of conciseness, alternative combinations of method features are not individually enumerated. Features applicable to methods, systems, and articles of manufacture are not repeated for each statutory class set of base features. The reader will understand how features identified in this section can readily be combined with base features in other statutory classes.

Matching the validated input address to an address stored in the records in the database can result in more than one matches with at least a common Where part. In such an implementation, the method includes providing the more than one matched multi-part place identifiers including common Where parts and different What parts. The What part includes address encoding and place-of-interest (or POI) encoding indicating different places at the same input address.

The address encoding in What part of the multi-part place identifier can consist of a sequence of three alpha numeric characters. The place-of-interest (or POI) encoding in What part of the multi-part place identifier can consist of a sequence of three alpha numeric characters. The Where part of the multi-part place identifier can consist of a sequence of nine alpha numeric characters. In other implementations, the technology disclosed can use more than three characters to encode the POI identifier and the address in What part of the multi-part place identifier. In other implementations, the system can use less than or more than nine characters to encode Where part of the multi-part place identifier.

The Where part of the multi-part place identifier, the place-of-interest (or POI) encoding and address encoding in the What part can be represented in base 28 using 28 alpha numeric characters. In other implementations, the system can use more than 28 or less than 28 characters to encode the place-of-interest identifier, the address, and the Where part in the multi-part place identifier.

The input location address can include a number, a street identifier, a city name, a region identifier, and a ZIP code.

When the input includes a place name, the method can match the validated input address and the input place name to an address in the stored records in the database. The method includes retrieving corresponding matched multi-part place identifier with a Where part and a What part. The method includes providing the matched multi-part place identifier with the Where part and the What part to a user for use in further analysis.

Each of the features discussed in this particular implementation section for the first method implementation apply equally to all other method implementation, except where incompatible. As indicated above, all the method features are not repeated in subsequent methods and should be considered repeated by reference.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Computer readable media (CRM) implementations of the technology disclosed include a non-transitory computer readable storage medium impressed with computer program instructions, when executed on a processor, implement the methods described above.

Each of the features discussed in this particular implementation section for the method implementation apply equally to the CRM implementation. As indicated above, all the system features are not repeated here and should be considered repeated by reference.

A system implementation of the technology disclosed includes one or more processors coupled to memory. The memory is loaded with computer instructions to find a multi-part place identifier with at least one part. The system includes logic to receive an input including an input location address and validating the input location address (e.g., using coding accuracy support system or CASS). The system includes logic to access a database storing records of validated addresses and corresponding multi-part place identifiers using the validated address. The system includes logic to match the validated input address to an address in the stored records in the database and retrieve corresponding matched multi-part place identifier with at least a Where part. The Where part can include an alpha numeric identifier indicating a geometrical boundary for the matched validated input address. The system includes logic to provide the matched multi-part place identifier with at least the Where part to a user for use in further analysis.

Each of the features discussed in this particular implementation section for the method implementations apply equally to this system implementation, except where incompatible. As indicated above, all the method features are not repeated for the system above and should be considered repeated by reference.

Other implementations may include a non-transitory computer readable storage medium storing instructions executable by a processor to perform functions of the system described above. Yet another implementation may include a method performing the functions of the system described above.

A computer readable storage medium (CRM) implementation of the technology disclosed includes a non-transitory computer readable storage medium impressed with computer program instructions to find a multi-part place identifier with at least one part. The instructions when executed on a processor, implement the method described above.

Each of the features discussed in this particular implementation section for the method implementation apply equally to the CRM implementation. As indicated above, all the method features are not repeated here and should be considered repeated by reference.

Computer System

Figure 9:
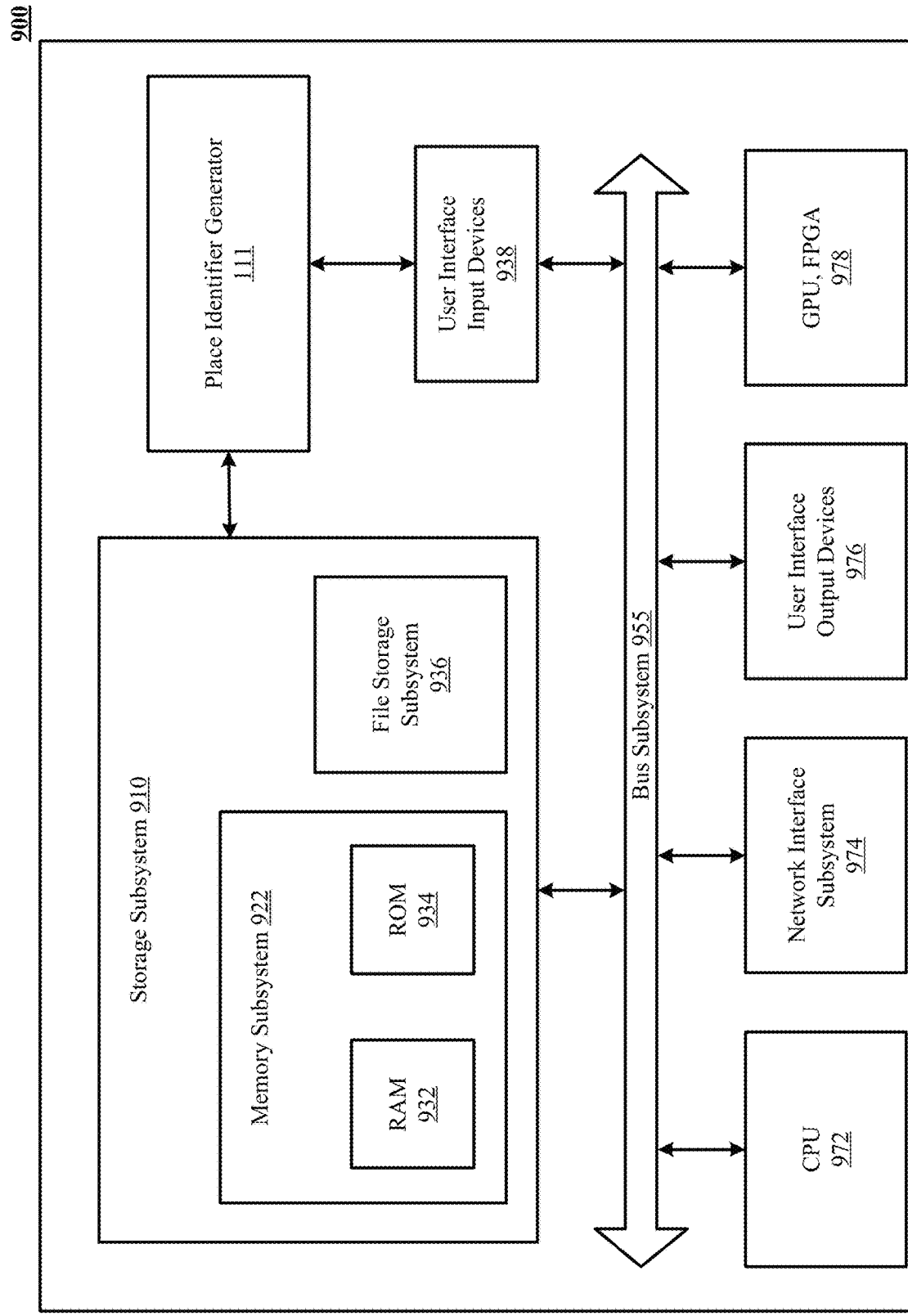
FIG. 9 presents an example computer system implementing the system of FIG. 1.

FIG. 9 is a simplified block diagram of a computer system 910 that can be used to implement the functions performed by the Place Identifier (Placekey) generator 111 and Place Identifier (Placekey) finder 131 in FIG. 1.

Computer system 910 typically includes a processor subsystem 914 which communicates with a number of peripheral devices via bus subsystem 912. These peripheral devices may include a storage subsystem 924, comprising a memory subsystem 926 and a file storage subsystem 928, user interface input devices 922, user interface output devices 920, and a network interface subsystem 916. The input and output devices allow user interaction with computer system 910. Network interface subsystem 916 provides an interface to outside networks, including an interface to communication network 918, and is coupled via communication network 918 to corresponding interface devices in other computer systems. For example, communication network 918 may be, or be coupled with, communication link 912. Communication network 918 may comprise many interconnected computer systems and communication links. These communication links may be wireline links, optical links, wireless links, or any other mechanisms for communication of information, but typically it is an IP-based communication network. While in one embodiment, communication network 918 is the Internet, in other embodiments, communication network 918 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 922 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 910 or onto computer network 918.

User interface output devices 920 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 910 to the user or to another machine or computer system.

Storage subsystem 924 stores the basic programming and data constructs that provide the functionality of certain embodiments of the present invention. For example, the various modules implementing the functionality of certain embodiments of the invention may be stored in storage subsystem 924. These software modules are generally executed by processor subsystem 914.

Memory subsystem 926 typically includes a number of memories including a main random access memory (RAM) 930 for storage of instructions and data during program execution and a read only memory (ROM) 932 in which fixed instructions are stored. File storage subsystem 928 provides persistent storage for program and data files, and may include a hard disk drive, a floppy disk drive along with associated removable media, a CD ROM drive, an optical drive, or removable media cartridges. When computer system 910 represents the Place Identifier generator 111, the encoding vocabulary database 115, the Place of Interest (or POI) recognized database 118, and the validated addresses (for Place Identifiers or Placekeys) database 159 may be stored in the storage subsystem 924, or it may be stored in a separate facility accessible to the article story generator 131 via communication network(s) 155. When computer system 910 represents the Place Identifier finder 131, the Place of Interest (or POI) recognized database 118, and the validated addresses (for Place Identifiers or Placekeys) database 159 may be stored in the storage subsystem 924, or it may be stored in a separate facility accessible to the article story generator 131 via communication network(s) 155. The databases and modules implementing the functionality of certain embodiments of the invention may have been provided on a computer readable medium such as one or more CD-ROMs, and may be stored in a non-transitory manner by file storage subsystem 928. The host memory 926 contains, among other things, computer instructions which, when executed by the processor subsystem 914, cause the computer system to operate or perform functions as described herein. As used herein, processes and software that are said to run in or on "the host" or "the computer", execute on the processor subsystem 914 in response to computer instructions and data in the host memory subsystem 926 including any other local or remote storage for such instructions and data.

Bus subsystem 912 provides a mechanism for letting the various components and subsystems of computer system 910 communicate with each other as intended. Although bus subsystem 912 is shown schematically as a single bus, alternative embodiments of the bus subsystem may use multiple busses.

Computer system 910 itself can be of varying types including a personal computer, a portable computer, a workstation, a computer terminal, a network computer, a television, a mainframe, a server farm, or any other data processing system or user device. Due to the ever-changing nature of computers and networks, the description of computer system 910 depicted in FIG. 9 is intended only as a specific example for purposes of illustrating the preferred embodiments of the present invention. Many other configurations of computer system 910 are possible having more or less components than the computer system depicted in FIG. 9.

We claim as follows:

1. A method of generating a multi-part place identifier, the method including:
   receiving a location address and a place name from a user;
   validating the location address to provide a validated location address;
   calculating a geocode for the validated location address;
   using the calculated geocode to identify a geometrical boundary encompassing the validated location address;
   encoding the identified geometrical boundary as an alpha-numeric identifier forming a Where part of the multi-part place identifier;
   encoding the validated location address as a portion of a What part of the multi-part place identifier to create a validated location address encoding using base-28 and comprising a sequence of at least three alpha numeric characters; and
   providing the multi-part place identifier to the user.

2. The method of claim 1, further including:
   calculating a place or point of interest (POI) identifier for the place name located at the validated location address and concatenating the validated location address encoding with the POI identifier to form another portion of the What part of the multi-part place identifier;
   joining the What part with the Where part using a joining symbol to form the multi-part place identifier uniquely identifying the place name at the location address; and
   providing the multi-part place identifier to the user.

3. The method of claim 2, further including using a default address encoding responsive to there being no address for the place name and concatenating the default address encoding with the POI identifier to form the What part of the multi-part place identifier, wherein the default address encoding is selected from a plurality of predetermined default address encodings.

4. The method of claim 2, wherein the address encoding in base-28 uses one or more of the alpha-numeric characters "23456789bcdfghjkmnpqrstvwxyz".

5. The method of claim 2, further including calculating the address encoding in the What part of multi-part place identifier in base-28 using 28 alpha-numeric characters.

6. The method of claim 2, further including accessing a database of place identifiers by matching the Where part of the multi-part place identifier, and
   calculating an incremental place or point of interest (POI) identifier for the place name located at the validated location address to form the portion of the What part of the multi-part place identifier for the matched Where part of the multi-part place identifier.

7. The method of claim 1, wherein the geometrical boundary encompassing the validated location address is a hexagon.

8. The method of claim 1, wherein the Where part of the multi-part place identifier is a sequence of nine alpha numeric characters.

9. The method of claim 1, further including calculating the Where part of the multi-part place identifier in base-28 using 28 alpha-numeric characters.

10. The method of claim 1, further including selecting a resolution level for the geometrical boundary encompassing the location address from at least three hierarchically arranged resolution levels.

11. The method of claim 1, further including accessing a database of place identifiers by matching the Where part of the multi-part place identifier, and
encoding the validated location address to determine an incremental address encoding for the location address within the geometrical boundary of the matched Where part of the multi-part place identifier.

12. The method of claim 1, wherein the validated location address includes a number, street identifier, a city name, a region identifier, and a ZIP code.

13. A system including one or more processors coupled to memory, the memory loaded with computer instructions to generate a multi-part place identifier, the instructions, when executed on the processors, implement actions comprising:
receiving a location address and a place name from a user;
validating the location address to provide a validated location address;
calculating a geocode for the validated location address;
using the calculated geocode to identify a geometrical boundary encompassing the validated location address;
encoding the identified geometrical boundary as an alpha-numeric identifier forming a Where part of the multi-part place identifier;
encoding the validated location address as a portion of a What part of the multi-part place identifier to create a validated location address encoding using base-28 and comprising a sequence of at least three alpha numeric characters; and
providing the multi-part place identifier to the user.

14. The system of claim 13, further implementing actions comprising:
calculating a place or point of interest (POI) identifier for the place name located at the validated location address;
concatenating the address encoding with the POI identifier to form another portion of the What part of the multi-part place identifier;
joining the What part with the Where part using a joining symbol to form the multi-part place identifier uniquely identifying the place name at the validated location address; and
providing the multi-part place identifier to the user.

15. The system of claim 14, further implementing actions comprising: using a default address encoding responsive to there being no address for the place name and concatenating the default address encoding with the POI identifier to form the What part of the multi-part place identifier, wherein the default address encoding is selected from a plurality of predetermined default address encodings.

16. The system of claim 14, wherein the address encoding in base-28 uses one or more of the alpha-numeric characters "23456789bcdfghjkmnpqrstvwxyz".

17. The system of claim 14, further implementing actions comprising:
calculating the address encoding in the What part of multi-part place identifier in base-28 using 28 alpha-numeric characters.

18. The system of claim 14, further implementing actions comprising:
accessing a database of place identifiers by matching the Where part of the multi-part place identifier, and
calculating an incremental place or point of interest (POI) identifier for the place name located at the validated location address to form the portion of the What part of the multi-part place identifier for the matched Where part of the multi-part place identifier.

19. A non-transitory computer readable storage medium impressed with computer program instructions to generate a multi-part place identifier with at least one part, the instructions, when executed on a processor, being configured to cause the processor to implement a method comprising:
receiving a location address and a place name from a user;
validate the location address to provide a validated location address;
calculating a geocode for the validated location address;
using the calculated geocode to identify a geometrical boundary encompassing the location address;
encoding the identified geometrical boundary as an alpha-numeric identifier forming a Where part of the multi-part place identifier;
encoding the validated location address as at least a portion of a What part of the multi-part place identifier to create a validated location address encoding using base-28 and comprising a sequence of at least three alpha numeric characters; and
providing the multi-part place identifier to the user.

20. The non-transitory computer readable storage medium of claim 19, wherein the geometrical boundary encompassing the location address is a hexagon.

21. The non-transitory computer readable storage medium of claim 19, wherein the Where part of the multi-part place identifier is a sequence of nine alpha numeric characters.

22. The non-transitory computer readable storage medium of claim 19, implementing the method further comprising:
encoding the Where part of the multi-part place identifier in base-28 using 28 alpha-numeric characters.

23. The non-transitory computer readable storage medium of claim 19, implementing the method further comprising:
selecting a resolution level for the geometrical boundary encompassing the validated location address from at least three hierarchically arranged resolution levels.

24. The non-transitory computer readable storage medium of claim 19, implementing the method further comprising:
accessing a database of place identifiers by matching the Where part of the multi-part place identifier, and
encoding the validated location address to determine an incremental address encoding for the validated location address within the geometrical boundary of the matched Where part of the multi-part place identifier.

25. The non-transitory computer readable storage medium of claim 19, wherein the location address includes a number, street identifier, a city name, a region identifier, and a ZIP code.

* * * * *